(12) United States Patent
Yu

(10) Patent No.: US 8,593,589 B2
(45) Date of Patent: Nov. 26, 2013

(54) LED BACK LIGHT MODULE AND LIQUID CRYSTAL DISPLAY DEVICE

(75) Inventor: Eric Yu, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 97 days.

(21) Appl. No.: 13/375,529

(22) PCT Filed: Oct. 18, 2011

(86) PCT No.: PCT/CN2011/080961
§ 371 (c)(1), (2), (4) Date: Dec. 1, 2011

(87) PCT Pub. No.: WO2013/053142
PCT Pub. Date: Apr. 18, 2013

(65) Prior Publication Data
US 2013/0093981 A1    Apr. 18, 2013

(30) Foreign Application Priority Data
Oct. 12, 2011    (CN) .......................... 2011 1 0308851

(51) Int. Cl.
*G02F 1/1335*    (2006.01)

(52) U.S. Cl.
USPC .............. 349/65; 349/58; 362/97.2; 362/612; 362/632

(58) Field of Classification Search
USPC .............. 349/65, 58, 67, 122; 362/97.1, 97.2, 362/97.3, 612, 615, 631, 632, 633, 634
See application file for complete search history.

(56) References Cited

U.S. PATENT DOCUMENTS

| | | | |
|---|---|---|---|
| 8,104,932 B2 * | 1/2012 | Hamada | 362/373 |
| 8,184,229 B2 * | 5/2012 | Nagaoka et al. | 349/58 |
| 2007/0008275 A1 * | 1/2007 | Sugitani et al. | 345/102 |
| 2007/0247564 A1 * | 10/2007 | Takahashi | 349/65 |
| 2010/0110334 A1 * | 5/2010 | Oki et al. | 349/62 |
| 2010/0231804 A1 * | 9/2010 | Hisakawa | 348/725 |

FOREIGN PATENT DOCUMENTS

| | | |
|---|---|---|
| CN | 1721928 A | 1/2006 |
| CN | 101044427 A | 9/2007 |
| CN | 101078835 A | 11/2007 |
| CN | 101149534 A | 3/2008 |
| CN | 101614352 A | 12/2009 |
| CN | 201401697 Y | 2/2010 |
| CN | 101676769 A | 3/2010 |
| CN | 101943351 A | 1/2011 |

(Continued)

OTHER PUBLICATIONS

Liu Yali, the International Searching Authority written comments, Aug. 2012, CN.

(Continued)

*Primary Examiner* — Thoi Duong
(74) *Attorney, Agent, or Firm* — IPro, Inc.; Na Xu

(57) ABSTRACT

The present invention discloses a LED back light module and a LCD device, wherein the LED back light module comprises a lamp source fixing device for fixing the LED light bar, and said lamp source fixing device is provided with multiple fins. Because the fins are arranged on the lamp source fixing device for fixing the LED light bar of the present invention, the heat dissipation area is increased, and the LED heat dissipation is improved.

15 Claims, 3 Drawing Sheets

(56) References Cited

FOREIGN PATENT DOCUMENTS

| | | |
|---|---|---|
| CN | 101943356 A | 1/2011 |
| CN | 101994950 A | 3/2011 |
| CN | 201885077 U | 6/2011 |
| CN | 102155691 A | 8/2011 |
| CN | 102322601 A | 1/2012 |
| WO | WO2011046341 A2 | 4/2011 |

OTHER PUBLICATIONS

Mo Fan, the first office action, Mar. 2013, CN.

* cited by examiner

LED BACK LIGHT MODULE AND LIQUID CRYSTAL DISPLAY DEVICE

TECHNICAL FIELD

The present invention relates to the field of displays, particularly to a light emitting diode (LED) back light module and a liquid crystal display (LCD) device.

BACKGROUND

As show in FIG. 1, with the reduction of the cost of LED, the LED used as a back light source is widely used in the field of LCDs because of the characteristics of high efficiency, energy saving and long service life. However, the high-brightness LED(s) has certain heat dissipation problem; particularly in the gradually compact back light module, the temperature will continuously rise because of narrow space and difficulty in heat dissipation; and the overhigh LED temperature will have an influence on the optical taste and the display effect of the overall back light module and will reduce the LED service life.

SUMMARY

The aim of the present invention is to provide a LED back light module and a LCD device thereof capable of improving the performance of LED heat dissipation.

The purpose of the present invention is achieved by the following technical schemes.

A LED back light module comprises a lamp source fixing device for fixing the LED light bar, and said lamp source fixing device is provided with multiple fins.

Preferably, said LED back light module also comprises a backplane for arranging the lamp source fixing device; said backplane is provided with fin insertion holes; and the fins are exposed outside the LED back light module through the fin insertion holes arranged in the backplane. The fins are exposed outside the LED back light module so that heat is directly dissipated to the outer air to further improve the heat dissipation effect. In addition, with the trend of light and thin LCD device, the technical scheme can improve the heat dissipation effect under the condition of not adding additional thickness, so as to achieve two goals with one scheme.

Preferably, said LED back light module also comprises a backplane for arranging the lamp source fixing device; said backplane is provided with fin insertion holes; said fin insertion holes are in clearance fit with said fins; and space for moving fins is reserved in said fin insertion holes in the direction facing the light guide plate. The lamp source fixing device is provided with certain moving space when the light guide plate is expanded with heat or is contracted with cold to avoid that the LED is extruded and damaged.

Preferably, said LED back light module also comprises a light guide plate which is arranged oppositely to the LED light bar, and said lamp source fixing device is fixedly connected with said light guide plate. Thus, the lamp source fixing device is moved with the heat expansion or cold contraction direction of the light guide plate to keep the distance between the LED lamp and the light guide plate so as to ensure high incident light efficiency; even zero light coupling distance is achieved, and the LED is not extruded and damaged by the light guide plate.

Preferably, the surface of said lamp source fixing device which is in contact with the light guide plate is provided with a step notch which is used for butting the light incident surface of the light guide plate. The lamp source fixing device is connected with the light guide plate by the reflective double sided adhesive tape (or other adhesive material), and the port of the surface of the lamp source fixing device which is in contact with the light guide plate is formed with a step notch. The distance between the light guide plate and the LED light emergent surface is controlled by the step notch, the light guide plate is fixed into the step notch of the lamp source fixing device, and the side surface of the light guide plate is in contact with the side wall of the step notch of the lamp source fixing device and cannot be in contact with the LED across the step notch. Therefore, zero light coupling distance between the LED light emergent surface and the light guide plate is achieved, and the pressure applied to the LED light emergent surface by the expansion and deformation of the light guide plate is not a concern.

Preferably, the main body of said lamp source fixing device is fixedly connected with the bottom surface of the light guide plate which is arranged oppositely to the light emergent surface; said lamp source fixing device is provided with an extension part in the position corresponding to the light emergent surface of the light guide plate; the extension part of said lamp source fixing device is fixedly connected to the light emergent surface of the light guide plate. The two surfaces are reliably fixed. In addition, the extension part of the lamp source fixing device can prevent the LED light leakage and increase the incident light efficiency of the light guide plate.

Preferably, the surface of the extension part of said lamp source fixing device which is in contact with the light guide plate is provided with a step notch which is used for butting the light incident surface of the light guide plate. The distance between the light guide plate and the LED light emergent surface is controlled by the steps notch; the light guide plate is fixed into the step notch of the lamp source fixing device; and the side surface of the light guide plate is in contact with the side wall of the step notch of the lamp source fixing device and cannot be in contact with the LED across the step notch. Therefore, zero light coupling distance between the LED light emergent surface and the light guide plate is achieved, and the pressure applied to the LED light emergent surface by the expansion and deformation of the light guide plate is not a concern.

Preferably, said light guide plate is fixedly connected with said lamp source fixing device by the reflective double sided adhesive tape. This is the specific fixing mode of the light guide plate and the lamp source fixing device. The reflective double sided adhesive tape can also reflect light when fixing the light guide plate and the lamp source fixing device to increase the incident light efficiency.

Preferably, said backplane is provided with a containing groove; said lamp source fixing device is arranged in said containing groove; one side of said containing groove opposite to the LED of the lamp source fixing device is provided with buffer material; and said buffer material is in contact with the main body of said lamp source fixing device. Because the lamp source fixing device is not fixedly arranged on the backplane, the lamp source fixing device is butted by buffer material such as rubber, spring and the like which have compression elasticity, to prevent the lamp source fixing device and the light guide plate from shaking in the back light module.

A LCD device comprises the aforementioned LED back light module.

Because the fins are arranged on the lamp source fixing device for fixing the LED light bar of the present invention, the heat dissipation area is increased, and the performance of LED heat dissipation is improved.

Wherein:

1. backplane; 11. fin insertion hole; 12. containing groove; 2. lamp source fixing device; 21. fin; 31. PCB; 32. LED; 4. light guide plate; 5. reflection sheet; 51. reflective double sided adhesive tape; 6. buffer material.

DETAILED DESCRIPTION

The present invention will further be described in detail in accordance with the figures and the preferred embodiments.

Embodiment 1

Figure 1:
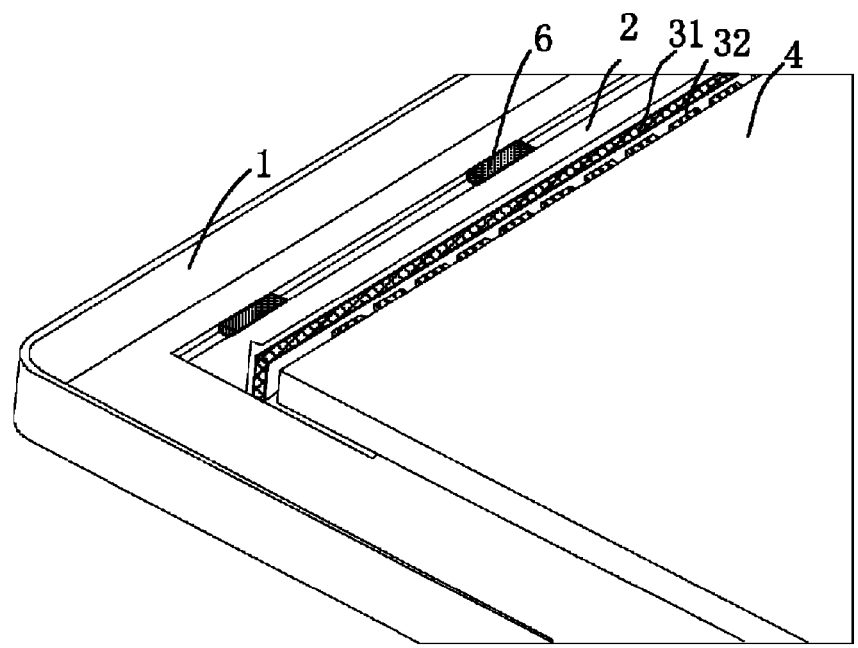
FIG. 1 is a partial diagram of the LED back light module of the present invention.
Figure 2:
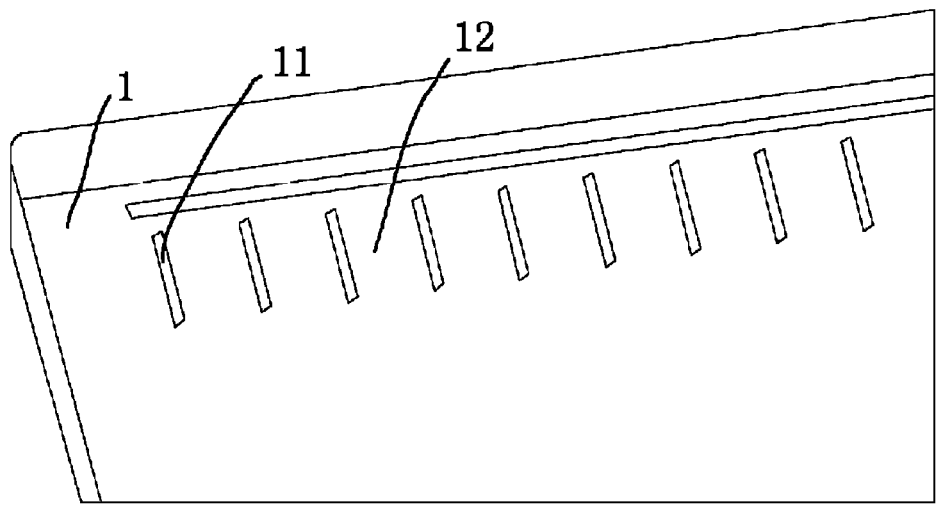
FIG. 2 is a schematic diagram of the fin insertion holes of the present invention.
Figure 3:
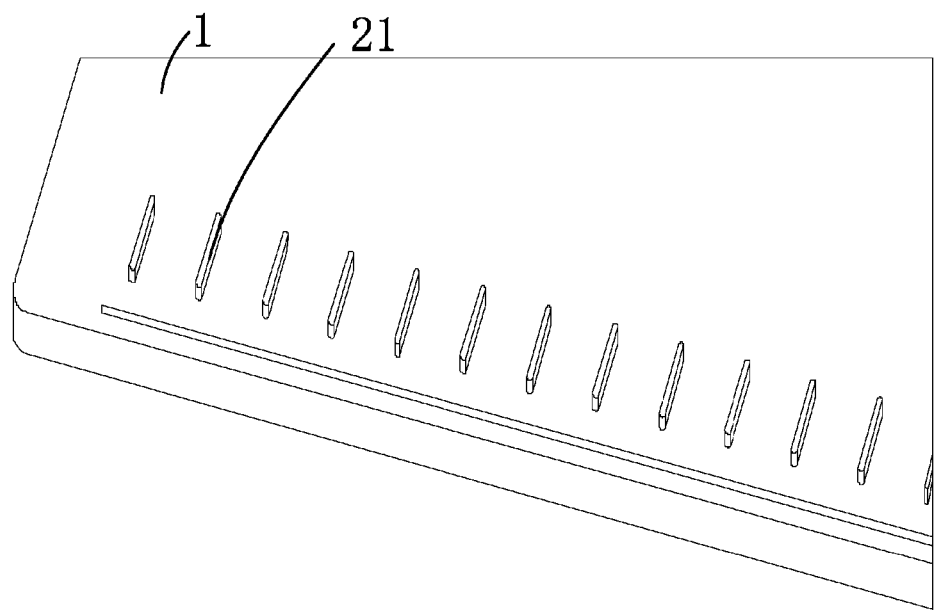
FIG. 3 is a schematic diagram of the fins of the present invention.

As shown in FIG. 1 to FIG. 3, a LCD device comprises a LED back light module; the LED back light module comprises a lamp source fixing device 2 for fixing the LED 32 light bar, a light guide plate 4 which is arranged oppositely to the LED 32 light bar, and a backplane 1 for fixing the lamp source fixing device 2. The bottom surface of the lamp source fixing device 2 which is in contact with the backplane 1 is provided with fins 21, and the shape of the fins 21 can be in sheet shape or other shapes such as cylinder shape and the like as well. Accordingly, the positions of the containing groove 12 of the backplane 1 corresponding to the fins 21 are provided with fin insertion holes 11, and the fins 21 are exposed outside the LED back light module through the fin insertion holes 11 arranged in the backplane 1. Said lamp source fixing device can be made of metal material with preferable heat dissipation, such as aluminum extrusion. The aluminum extrusion has the advantages of moderate price, light weight, good heat dissipation and higher cost performance. The lamp source fixing device made of metal material can also perform the heat dissipation function when effectively fixing the LED light bar.

Furthermore, said fin insertion holes 11 are in clearance fit with said fins 21, and space for moving fins 21 is reserved in said fin insertion holes 11 in the direction facing the light guide plate 4. Thus, the lamp source fixing device 2 is provided with certain moving space when the light guide plate is expanded with heat or is contracted with cold to avoid that LED is extruded and damaged.

Embodiment 2

Figure 4:
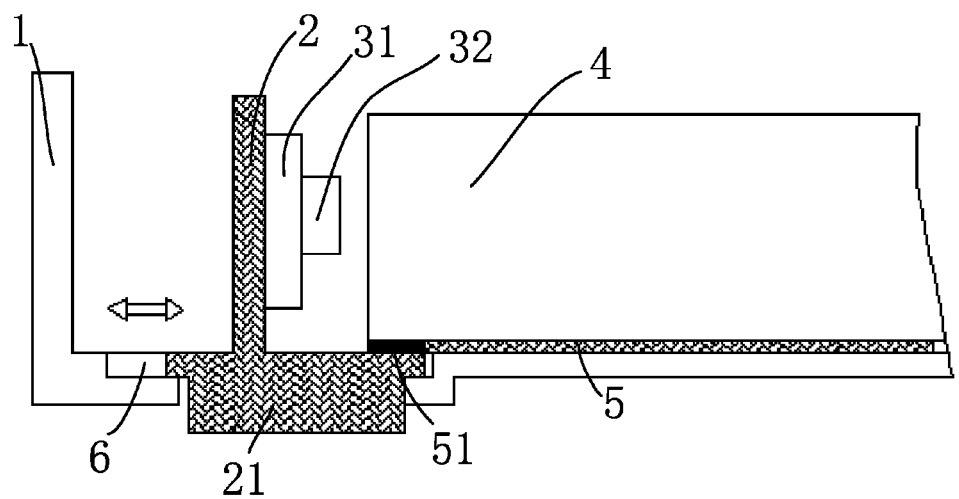
FIG. 4 is a structural diagram of the LED back light module without step notch of a first embodiment of the present invention.
Figure 5:
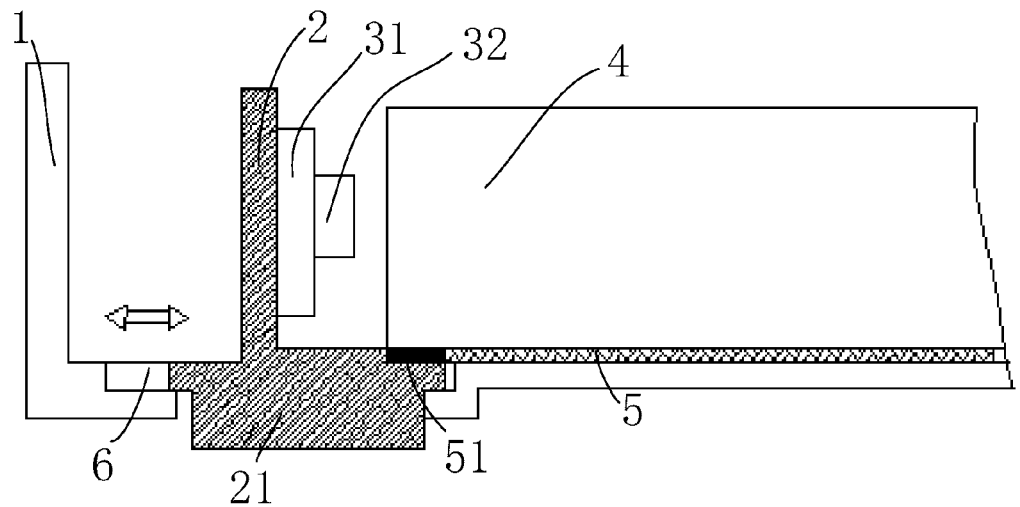
FIG. 5 is a structural diagram of the LED back light module with a step notch of a first embodiment of the present invention.
Figure 6:
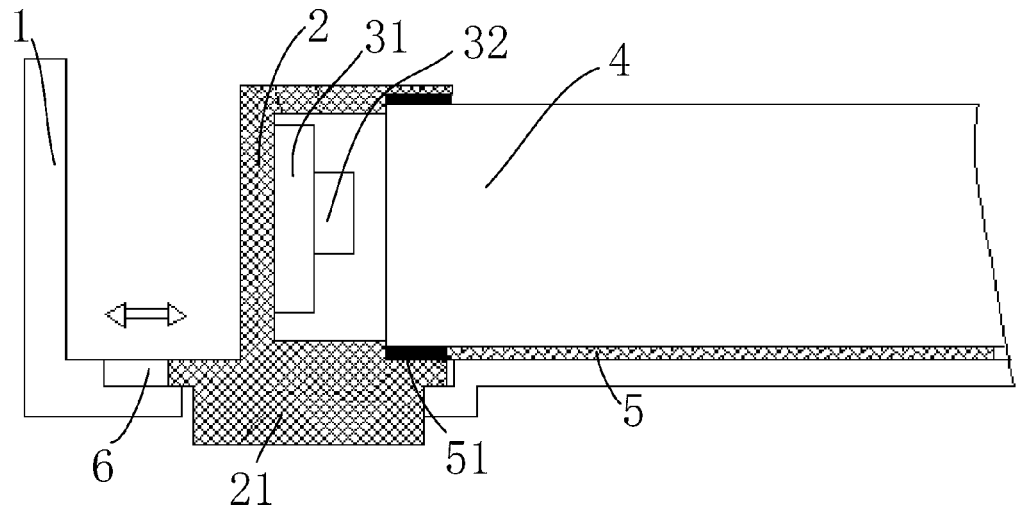
FIG. 6 is a structural diagram of the LED back light module of a second embodiment of the present invention.

As shown in FIG. 4 to FIG. 6, a LCD device comprises a LED back light module, and the LED back light module comprises a lamp source fixing device 2 for fixing the LED 32 light bar, a light guide plate 4 which is arranged oppositely to the LED 32 light bar, and a backplane 1 for fixing the lamp source fixing device 2. The bottom surface of said lamp source fixing device 2 which is in contact with the backplane 1 is provided with fins 21, and the fins 21 can be in sheet shape or other shapes such as cylinder shape and the like. Accordingly, the positions of the backplane 1 containing groove 12 corresponding to the fins 21 are provided with fin insertion holes 11, and the fins 21 are exposed outside the LED back light module through the fin insertion holes 11 arranged in the backplane 1. Of course, the unexposed parts of the fins 21 also belong to the protection scope of the present invention.

Said LED 32 light bar comprises LED 32 and PCB 31 connected with the LED 32, wherein the PCB 31 is fixed on the lamp source fixing device 2. The surface of the lamp source fixing device 2 which is in contact with the backplane 1 is the bottom surface; one side of the bottom surface of the lamp source fixing device 2 is provided with a reflection sheet 5; the light guide plate 4 is arranged on the reflection sheet 5; and one side of the light guide plate 4 is arranged oppositely to the LED 32.

Said lamp source fixing device 2 is fixedly connected with said light guide plate 4; the bottom surface of the light guide plate 4 which is in contact with the reflection sheet 5 is partially overlapped with the main body of the lamp source fixing device 2; and the light guide plate 4 and the lamp source fixing device 2 are bonded together by the reflective double sided adhesive tape 51 or other adhesive material. Of course, the lamp source fixing device 2 and the light guide plate 4 can be fixed by screws, rivets and the like. The lamp source fixing device is moved with the heat expansion or cold contraction direction of the light guide plate to keep the distance between the LED lamp and the light guide plate so as to ensure high incident light efficiency; zero light coupling distance is achieved, and the LED is not extruded and damaged by the light guide plate.

Said lamp source fixing device 2 is movably arranged on said backplane 1. Furthermore, the backplane 1 is provided with a containing groove 12 for arranging said lamp source fixing device 2; several sections or a whole section of buffer material 6 such as rubber strip, spring and the like which have compression elasticity is arranged between one side opposite to the LED 32 light bar attached to the lamp source fixing device 2 and the wall of the containing groove 12. Because the lamp source fixing device 2 is not fixedly arranged on the backplane 1, the lamp source fixing device 2 is butted by the buffer material 6 such as rubber, spring and the like which have compression elasticity, to prevent the lamp source fixing device 2 and the light guide plate 4 from shaking in the back light module.

In order to be matched with the LED to dissipate heat, said lamp source fixing device can be made of metal material with preferable heat dissipation, such as aluminum extrusion. The aluminum extrusion has the advantages of moderate price, light weight, good heat dissipation and higher cost performance. The lamp source fixing device made of metal material can also perform the heat dissipation function when effectively fixing the LED light bar.

Said fin insertion holes 11 are in clearance fit with said fins 21, and space for moving the fins 21 is reserved in said fin insertion holes 11 in the direction facing the light guide plate 4. Thus, when light guide plate is expanded with heat or is contracted with cold, the fins 21 can be moved together with the lamp source fixing device 2 so that the LED can be prevented from being extruded and damaged and the heat dissipation effect can be enhanced.

Furthermore, the main body of said lamp source fixing device 2 is fixedly connected with the bottom surface of the light guide plate 4 which is arranged oppositely to the light emergent surface; said lamp source fixing device 2 is provided with an extension part in the position corresponding to the light emergent surface of the light guide plate 4; the extension part of said lamp source fixing device 2 is fixedly connected to the light emergent surface of the light guide plate 4. The lamp source fixing device 2 can be connected with the light guide plate 4 by the reflective double sided adhesive tape 51 or other adhesive material; of course, the lamp source fixing device 2 and the light guide plate 4 can be fixed by screws, rivets and the like. The two surfaces are reliably fixed, and the extension part of the lamp source fixing device 2 is connected with the light emergent surface of the light guide plate 4. Therefore, a relatively hermetic space is formed between the lamp source fixing device 2 and the light guide plate 4 so that the light of LED 32 is effectively prevent from leaking, and the phenomenon of light leakage is avoided.

The surface of said lamp source fixing device 2 which is in contact with the light guide plate 4 is provided with a step notch which is used for butting the light incident surface of the light guide plate 4. The lamp source fixing device 2 is connected with the light guide plate 4 by the reflective double sided adhesive tape 51 (or other adhesive material), and the port of the surface of the lamp source fixing device 2 which is in contact with the light guide plate 4 is formed with a step notch. The distance between the light guide plate 4 and the LED 32 light emergent surface is controlled by the step notch; the light guide plate 4 is fixed into the step notch of the lamp source fixing device 2; and the side surface of the light guide plate 4 is in contact with the side wall of the step notch of the lamp source fixing device 2 and cannot be in contact with the LED 32 across the step notch. Therefore, zero light coupling distance between the LED 32 light emergent surface and the light guide plate 4 is achieved, and the pressure applied to the LED 32 light emergent surface by the expansion and deformation of the light guide plate 4 is not a concern.

Meanwhile, the LED 32 light bar is bonded or attached to the lamp source fixing device 2. In order to ensure that the incident light efficiency of the LED 32 is improved, a fixed and appropriate light coupling distance must be kept between the light emergent surface of the LED 32 and the light incident surface of the light guide plate 4. However, the LED 32 temperature is higher, the light guide plate 4 is easy to be expanded with heat and deformed, so that the light coupling distance is different from the initial set value to some extent. The fins of the lamp source fixing device 2 and the holes corresponding to fins in the containing groove 12 are used for guiding. When the light guide plate 4 is expanded with heat, the light guide plate 4 guides the force generated by deformation to the lamp source fixing device 2 and is backwards moved together with the lamp source fixing device 2 in the containing groove 12 so that the light guide plate 4 cannot directly press the LED 32 surface. Thus, the fixed light coupling distance between the light guide plate 4 and the LED 32 light emergent surface is accurately kept; when the temperature is reduced, the light guide plate 4 is restored to the original shape; the lamp source fixing device 2 is restored to the original position together with the light guide plate 4; and the fixed light coupling distance is still kept. The light coupling distance even can be zero, and the risk that the LED 32 is crushed is not a concern.

Finally, the light guide plate 4 is even not machined; the square light guide plate 4 is directly used for positioning; and the machining cost is saved.

To sum up, the heat is dissipated to the air through the contact convection of the fins 21 of the lamp source fixing device 2 and air. Thus, the temperature of the whole back light module of the present invention is effectively reduced, and the service life of the LED 32 is extended; the stability of the light coupling distance between the light emergent surface of the LED 32 light source and the light incident surface of the light guide plate 4 is improved, and the incident light efficiency is increased; the margin space of the lamp source fixing device 2 can absorb the deformation because the light guide plate 4 is expanded with heat to prevent the light guide plate 4 from being deformed; the light guide plate 4 is positioned without cutting, and the machining cost of the light guide plate 4 is saved.

The present invention is described in detail in accordance with the above contents with the specific preferred embodiments. However, this invention is not limited to the specific embodiments. For the ordinary technical personnel of the technical field of the present invention, on the premise of keeping the conception of the present invention, the technical personnel can also make simple deductions or replacements, and all of which should be considered to belong to the protection scope of the present invention.

I claim:

1. A light emitting diode (LED) back light module, comprising: a lamp source fixing device for fixing LED light bar; said lamp source fixing device is provided with multiple fins;
   wherein said LED back light module also comprises a light guide plate which is arranged oppositely to the LED light bar, and said lamp source fixing device is fixedly connected with said light guide plate; and
   wherein said LED back light module also comprises a backplane for arranging the lamp source fixing device; said backplane is provided with a containing groove; said lamp source fixing device is arranged in said containing groove; one side of said containing groove opposite to the LED of the lamp source fixing device is provided with buffer material; and said buffer material is in contact with a main body of said lamp source fixing device.

2. The LED back light module of claim 1, wherein said backplane is provided with fin insertion holes, and the fins are exposed outside the LED back light module through the fin insertion holes arranged in the backplane.

3. The LED back light module of claim 1, wherein said backplane is provided with fin insertion holes; said fin insertion holes are in clearance fit with said fins, and space for moving fins is reserved in said fin insertion holes in the direction facing the light guide plate.

4. The LED back light module of claim 1, wherein a surface of said lamp source fixing device which is in contact with the light guide plate is provided with a step notch which is used for butting the light incident surface of the light guide plate.

5. The LED back light module of claim 1, wherein the main body of said lamp source fixing device is fixedly connected with a bottom surface of the light guide plate which is arranged oppositely to a light emergent surface; said lamp source fixing device is provided with an extension part in the position corresponding to the light emergent surface of the light guide plate; the extension part of said lamp source fixing device is fixedly connected to the light emergent surface of the light guide plate.

6. The LED back light module of claim 5, wherein a surface of the extension part of said lamp source fixing device which is in contact with the light guide plate is provided with a step notch which is used for butting the light incident surface of the light guide plate.

7. The LED back light module of claim 1, wherein said light guide plate is fixedly connected with said lamp source fixing device by a reflective double sided adhesive tape.

8. A liquid crystal display (LCD) device comprising an LED back light module, wherein said LED back light module comprises a lamp source fixing device for fixing LED light bar, and said lamp source fixing device is provided with multiple fins;
wherein said LED back light module also comprises a light guide plate which is arranged oppositely to the LED light bar, and said lamp source fixing device is fixedly connected with said light guide plate; and
wherein said LED back light module also comprises a backplane for arranging the lamp source fixing device; said backplane is provided with a containing groove; said lamp source fixing device is arranged in said containing groove; one side of said containing groove opposite to the LED of the lamp source fixing device is provided with buffer material; and said buffer material is in contact with a main body of said lamp source fixing device.

9. The LCD device of claim 8, wherein said backplane is provided with fin insertion holes, and the fins are exposed outside the LED back light module through the fin insertion holes arranged in the backplane.

10. The LCD device of claim 8, wherein said backplane is provided with fin insertion holes; said fin insertion holes are in clearance fit with said fins, and space for moving fins is reserved in said fin insertion holes in the direction facing the light guide plate.

11. The LCD device of claim 8, wherein a surface of said lamp source fixing device which is in contact with the light guide plate is provided with a step notch which is used for butting the light incident surface of the light guide plate.

12. The LCD device of claim 8, wherein the main body of said lamp source fixing device is fixedly connected with a bottom surface of the light guide plate which is arranged oppositely to a light emergent surface; said lamp source fixing device is provided with an extension part in the position corresponding to the light emergent surface of the light guide plate; the extension part of said lamp source fixing device is fixedly connected to the light emergent surface of the light guide plate.

13. The LCD device of claim 12, wherein a surface of the extension part of said lamp source fixing device which is in contact with the light guide plate is provided with a step notch which is used for butting the light incident surface of the light guide plate.

14. The LCD device of claim 8, wherein said light guide plate is fixedly connected with said lamp source fixing device by a reflective double sided adhesive tape.

15. A light emitting diode (LED) back light module, comprising: a lamp source fixing device for fixing LED light bar; said lamp source fixing device is provided with multiple fins; wherein said LED back light module also comprises a backplane for arranging the lamp source fixing device; said backplane is provided with fin insertion holes; said fin insertion holes are in clearance fit with said fins, and space for moving fins is reserved in said fin insertion holes in the direction facing a light guide plate.

* * * * *